United States Patent
Roh et al.

(10) Patent No.: US 10,782,963 B2
(45) Date of Patent: Sep. 22, 2020

(54) INTRODUCING ARTIFACT INFORMATION SYSTEM AND METHOD

(71) Applicants: Stepan Roh, Prague (CZ); Jan Stawarczyk, Prague (CZ); Jiri Walek, Orlová (CZ)

(72) Inventors: Stepan Roh, Prague (CZ); Jan Stawarczyk, Prague (CZ); Jiri Walek, Orlová (CZ)

(73) Assignee: SIEMENS INDUSTRY SOFTWARE GMBH, Zürich (CH)

( * ) Notice: Subject to any disclaimer, the term of this patent is extended or adjusted under 35 U.S.C. 154(b) by 0 days.

(21) Appl. No.: 15/700,330

(22) Filed: Sep. 11, 2017

(65) Prior Publication Data

US 2019/0079758 A1    Mar. 14, 2019

(51) Int. Cl.
*G06F 8/73* (2018.01)
*G06F 40/166* (2020.01)
(Continued)

(52) U.S. Cl.
CPC ............ *G06F 8/73* (2013.01); *G06F 8/71* (2013.01); *G06F 40/166* (2020.01); *G06F 3/048* (2013.01)

(58) Field of Classification Search
CPC ... G06F 8/71; G06F 8/73; G06F 3/048; G06F 8/33–8/34; G06F 8/38; G06F 40/166; G06F 17/24–248

See application file for complete search history.

(56) References Cited

U.S. PATENT DOCUMENTS

| 5,504,902 A | * | 4/1996 | McGrath | G06F 8/33 715/703 |
| 5,603,018 A | * | 2/1997 | Terada | G06F 8/34 707/999.001 |

(Continued)

OTHER PUBLICATIONS

Chen et al., "BezelCopy: An Efficient Cross-Application Copy-Paste Technique for Touchscreen Smartphones", published by AVI '14, May 27-30, 2014, Como, Italy, pp. 185-192 (Year: 2014).*

(Continued)

*Primary Examiner* — S. Sough
*Assistant Examiner* — Zheng Wei
(74) *Attorney, Agent, or Firm* — Lempia Summerfield Katz LLC (57) ABSTRACT

A system for facilitating introducing artifact information may include a processor configured to: cause a first sequence of artifact information of a first artifact document and a second sequence of artifact information of a second artifact document to be displayed in a GUI; receive a first input through an input device corresponding to a first selection of a first subsequence of the first sequence for introduction into the second sequence; determine an introduction action available for introducing artifact information derived from the selected first subsequence into the second sequence; cause the available introduction action to be displayed in an introduction box in the GUI; receive a second input through the input device corresponding to a second selection of an available introduction action; and create a first amended subsequence of artifact information in the second sequence by introducing the artifact information being derived from the selected first subsequence.

23 Claims, 5 Drawing Sheets

(51) Int. Cl.
  *G06F 8/71* (2018.01)
  *G06F 3/048* (2013.01)

(56) References Cited

U.S. PATENT DOCUMENTS

| | | | | |
|---|---|---|---|---|
| 5,696,914 | A * | 12/1997 | Nahaboo | G06F 8/38 345/619 |
| 5,760,788 | A * | 6/1998 | Chainini | G06F 8/34 345/474 |
| 6,113,649 | A * | 9/2000 | Govindaraj | G06F 8/34 717/113 |
| 6,163,879 | A * | 12/2000 | Mackey | G06F 8/33 715/744 |
| 6,243,859 | B1 * | 6/2001 | Chen-Kuang | G06F 8/33 717/111 |
| 6,427,142 | B1 * | 7/2002 | Zachary | G06F 8/34 706/11 |
| 6,792,595 | B1 * | 9/2004 | Storistenau | G06F 8/33 345/650 |
| 7,360,151 | B1 * | 4/2008 | Froloff | G06F 17/248 715/255 |
| 7,389,495 | B2 * | 6/2008 | Wang | G06F 21/53 717/124 |
| 7,552,421 | B1 * | 6/2009 | Raw | G06F 8/33 717/100 |
| 7,778,866 | B2 * | 8/2010 | Hughes | G06F 8/20 705/7.42 |
| 7,886,264 | B1 * | 2/2011 | Peyton | G06F 8/34 709/201 |
| 7,945,589 | B1 * | 5/2011 | Weiss | G06F 8/71 707/795 |
| 8,225,283 | B2 * | 7/2012 | Singh | G06F 8/71 717/101 |
| 8,250,527 | B1 * | 8/2012 | Gubbay | G06F 8/33 717/111 |
| 8,271,520 | B1 * | 9/2012 | Aman | G06F 8/34 707/769 |
| 8,275,855 | B2 * | 9/2012 | Kothari | H04L 43/50 709/218 |
| 8,347,276 | B2 * | 1/2013 | Schadow | G06F 8/20 715/239 |
| 8,522,196 | B1 * | 8/2013 | Kim | G06F 11/3664 717/100 |
| 8,584,112 | B2 * | 11/2013 | Young | G06F 8/70 717/162 |
| 8,775,974 | B2 * | 7/2014 | Cowan | G06Q 10/107 707/638 |
| 8,949,792 | B2 * | 2/2015 | Paterson | G06F 11/3664 714/38.1 |
| 9,141,348 | B1 * | 9/2015 | Bienkowski | G06F 9/453 |
| 9,170,783 | B1 * | 10/2015 | Orofino, II | G06F 8/33 |
| 9,342,276 | B1 * | 5/2016 | Lin | G06F 8/34 |
| 9,552,237 | B2 * | 1/2017 | Biesack | G06F 9/541 |
| 9,733,902 | B2 * | 8/2017 | Northrup | G06F 8/34 |
| 9,811,235 | B2 * | 11/2017 | Hammontree | G06F 8/33 |
| 9,870,205 | B1 * | 1/2018 | Elliot | G06F 8/41 |
| 10,198,156 | B2 * | 2/2019 | Stefan | G06F 3/0484 |
| 2002/0026461 | A1 * | 2/2002 | Kutay | G06F 8/34 715/239 |
| 2002/0199025 | A1 * | 12/2002 | Kutay | G06F 8/10 709/250 |
| 2003/0071844 | A1 * | 4/2003 | Evans | G06F 8/34 715/763 |
| 2003/0090473 | A1 * | 5/2003 | Joshi | G06F 3/0237 345/173 |
| 2005/0125774 | A1 * | 6/2005 | Barsness | G06F 8/33 717/110 |
| 2005/0188322 | A1 * | 8/2005 | Napoleon | G06F 3/0481 715/760 |
| 2007/0089053 | A1 * | 4/2007 | Uhlig | G06F 17/212 715/255 |
| 2008/0077870 | A1 * | 3/2008 | Napoleon | G06F 3/0481 715/762 |
| 2009/0138845 | A1 * | 5/2009 | Leonard | G06F 8/34 717/105 |
| 2009/0254877 | A1 * | 10/2009 | Kuriakose | G06F 8/36 717/105 |
| 2009/0254880 | A1 * | 10/2009 | Gryko | G06F 8/33 717/109 |
| 2011/0016412 | A1 * | 1/2011 | Grosz | G06F 17/3028 715/760 |
| 2011/0197124 | A1 * | 8/2011 | Garaventa | G06F 17/30893 715/234 |
| 2011/0231784 | A1 * | 9/2011 | Meng | G06F 16/958 715/762 |
| 2011/0302556 | A1 * | 12/2011 | Drukman | G06F 8/33 717/113 |
| 2013/0086483 | A1 * | 4/2013 | Vainer | G06F 9/452 715/751 |
| 2013/0086495 | A1 * | 4/2013 | Guzansky | G06Q 10/10 715/762 |
| 2013/0091132 | A1 * | 4/2013 | Khalatov | G06Q 10/063118 707/732 |
| 2013/0091456 | A1 * | 4/2013 | Sherman | G06Q 10/06 715/778 |
| 2013/0159926 | A1 * | 6/2013 | Vainer | G06F 17/30 715/804 |
| 2013/0174120 | A1 * | 7/2013 | Kalaidjian | G06F 8/34 717/113 |
| 2014/0075364 | A1 * | 3/2014 | Bragdon | G06F 8/33 715/772 |
| 2014/0245256 | A1 * | 8/2014 | Petzoldt | G06F 8/34 717/109 |
| 2014/0250369 | A1 * | 9/2014 | Mitnick | G06F 17/24 715/235 |
| 2014/0282377 | A1 * | 9/2014 | Hammontree | G06F 8/33 717/109 |
| 2014/0304628 | A1 * | 10/2014 | Soni | G06F 17/243 715/764 |
| 2015/0301806 | A1 * | 10/2015 | Leon | G06F 8/33 717/113 |
| 2016/0026439 | A1 * | 1/2016 | Zaydman | G06F 8/33 717/113 |
| 2016/0054982 | A1 * | 2/2016 | Itani | G06F 8/36 717/105 |
| 2016/0103676 | A1 | 4/2016 | Akbulut | |
| 2016/0111018 | A1 * | 4/2016 | Sousa | G09B 19/0053 434/118 |
| 2016/0117087 | A1 * | 4/2016 | Couris | G06F 8/38 715/771 |
| 2016/0239277 | A1 * | 8/2016 | Ahuja | G06F 8/436 |
| 2016/0274867 | A1 * | 9/2016 | Narayanan | G06F 3/04842 |
| 2016/0313983 | A1 * | 10/2016 | Davidchuk | G06F 8/38 |
| 2016/0358505 | A1 * | 12/2016 | Isted | G06F 3/04883 |
| 2017/0031679 | A1 | 2/2017 | Matthew | |
| 2017/0097973 | A1 * | 4/2017 | Iannaccone | G06F 17/30575 |
| 2017/0109139 | A1 * | 4/2017 | Bitner | G06F 8/33 |
| 2017/0132184 | A1 * | 5/2017 | Matthew | G06F 16/30 |
| 2018/0131536 | A1 * | 5/2018 | McCoy | G06F 8/10 |

OTHER PUBLICATIONS

"Pasting Options in MS Word 2010 (eliminate frustrations associated with copying from another source and pasting in MS Word): Speakeasy Solutions; Blog" 2011. URL:http://www.speakeasysolutions.com/blog/2011/05/24/pasting-options-in-ms-word-2010-eliminate-frustrations-associated-with-copying-from-another-source-and-pasting-in-ms-word/; retrieved on Mar. 8, 2019.

European Search Report for European Patent Application No. 18193372.2-1231 dated Jan. 31, 2019.

\* cited by examiner

FIG 2

Approved Versions
Current Document versions has not been approved.
Approved Versions:
The Document has not been approved yet.

Document Signatures
No signed status transactions.

1 Introduction

1.1 Purpose
INFO: This document describes the HW design of the system being developed. Component described in this document has been identified as needed to implement requirements from the System Requirements Vacation. Together, these documents provide the design specification needed to implement the system.

1.2 Scope
Describe the scope of this document as it relates to the project.

1.3 References
TODO: List any other documents or Web addresses to which this document refers.

2 Components
MEE-464 – A mechanical requirement
MEE-465 – An electrical requirement

3 Requirements Traceability
Browse the Requirements refined by design items using
Requirements - Design Traceability Tree

[CTRL+C]

---

1 Introduction
INFO: The System Test Specification

1.1 Scope
TODO: Describe the scope of this document as it relates to the project.

1.2 References
TODO: List any other documents or Web addresses to which this document refers.

2 Test Items
All the system requirements from the System Requirements Specification to be covered by test cases collected in this document.
- System Requirements Specification

3 Approach Refinement
TODO: Document any changes to the system validation and verification plan.
- System validation and verification plan

4 Test specification
MEE-463 – SAMPLE: A test case

| Step | Step Description | Expected Result |
|---|---|---|
| Step One | Step Description | Expected Result to be checked |

An electrical requirement

[CTRL+V]

Introduce Work Item as:
☑ Reference Work Item
   System Test Case
   Test Case Description
   System Requirement

FIG 3

Approved Versions
Current Document versions has not been approved.
Approved Versions:
The Document has not been approved yet.

Document Signatures
No signed status transactions.

1 Introduction

1.1 Purpose
*INFO: This document describes the HW design of the system being developed. Component described in this document has been identified as needed to implement requirements from the System Requirements Vacation. Together, these documents provide the design specification needed to implement the system.*

1.2 Scope
*Describe the scope of this document as it relates to the project.*

1.3 References
*TODO: List any other documents or Web addresses to which this document refers.*

2 Components
MEE-464 – A mechanical requirement
MEE-465 – An electrical requirement

3 Requirements Traceability
Browse the Requirements refined by design items using
Requirements - Design Traceability Tree

[CTRL + C]

---

1 Introduction
*INFO: The System Test Specification*

1.1 Scope
*TODO: Describe the scope of this document as it relates to the project.*

1.2 References
*TODO: List any other documents or Web addresses to which this document refers.*

2 Test Items
All the system requirements from the System Requirements Specification to be covered by test cases collected in this document.
• System Requirements Specification

3 Approach Refinement
*TODO: Document any changes to the system validation and verification plan.*
• System validation and verification plan

4 Test specification
MEE-463 – SAMPLE: A test case

| Step | Step Description | Expected Result |
|------|------------------|-----------------|
| Step One | Step Description | Expected Result to be checked |

An electrical requirement

[CTRL + V]

---

Introduce Work Item as:
Reference Work Item
☑ System Test Case
→ Options
  Test Case Description
  System Requirement

---

Basic content
Title, Description, Test Steps

Advanced content
Basic + Priority, Severity, Links, Attachments, Custom fields

FIG. 5

INTRODUCING ARTIFACT INFORMATION SYSTEM AND METHOD

TECHNICAL FIELD

The present disclosure is directed, in general, to product lifecycle management (PLM) systems, application lifecycle management (ALM) systems, in particular for software, artifact information systems and similar systems, that are used to create, use, and manage data for products including software and artifacts and other items (collectively referred to herein as product systems).

BACKGROUND

Product systems may include stored content associated with products including software and artifacts and other items. Such product systems may benefit from improvements.

SUMMARY

Variously disclosed embodiments include data processing systems and methods that may be used to facilitate introducing artifact information.

In one example, a system for introducing artifact information of at least one first artifact document into at least one second artifact document may include at least one processor configured to generate a graphical user interface (GUI) through a display device that enables a first sequence of artifact information of the first artifact document and a second sequence of artifact information of the second artifact document stored in a data store and an introduction box to be displayable in the GUI; cause the first sequence of artifact information of the at least one first artifact document and the second sequence of artifact information of the at least one second artifact document to be displayed in the GUI; receive at least one first input through an input device corresponding to a first selection of at least one first subsequence of the at least one first sequence for introduction into the at least one second sequence; determine at least one introduction action available for introducing artifact information derived from the selected at least one first subsequence into the at least one second sequence, wherein at least one of the selected at least one first subsequence, the at least one first sequence, the at least one first artifact document or any combination thereof is of a first artifact information type, and wherein at least one of the at least one second sequence, the at least one second artifact document or any combination thereof is of a second artifact information type being different from the first artifact information type; cause the at least one available introduction action to be displayed in the introduction box in the GUI; receive at least one second input through the input device corresponding to a second selection of one of the at least one available introduction action; and create at least one first amended subsequence of artifact information in the second sequence by introducing said artifact information being derived from the selected at least one first subsequence.

In another example, a method for introducing artifact information of at least one first artifact document into at least one second artifact document may include through operation of at least one processor generating a graphical user interface (GUI) through a display device that enables a first sequence of artifact information of the first artifact document and a second sequence of artifact information of the second artifact document stored in a data store and an introduction box to be displayable in the GUI; causing the first sequence of artifact information of the at least one first artifact document and the second sequence of artifact information of the at least one second artifact document to be displayed in the GUI; receiving at least one first input through an input device corresponding to a first selection of at least one first subsequence of the at least one first sequence for introduction into the at least one second sequence; determining at least one introduction action available for introducing artifact information derived from the selected at least one first subsequence into the at least one second sequence, wherein at least one of the selected at least one first subsequence, the at least one first sequence, the at least one first artifact document or any combination thereof is of a first artifact information type, and wherein at least one of the at least one second sequence, the at least one second artifact document or any combination thereof is of a second artifact information type being different from the first artifact information type; causing the at least one available introduction action to be displayed in the introduction box in the GUI; receiving at least one second input through the input device corresponding to a second selection of one of the at least one available introduction action; and creating at least one first amended subsequence of artifact information in the second sequence by introducing said artifact information being derived from the selected at least one first subsequence.

A further example may include non-transitory computer readable medium encoded with executable instructions (such as a software component on a storage device) that when executed, causes at least one processor to carry out this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Various technologies that pertain to systems and methods for introducing artifact information of at least one first artifact document into at least one second artifact document in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
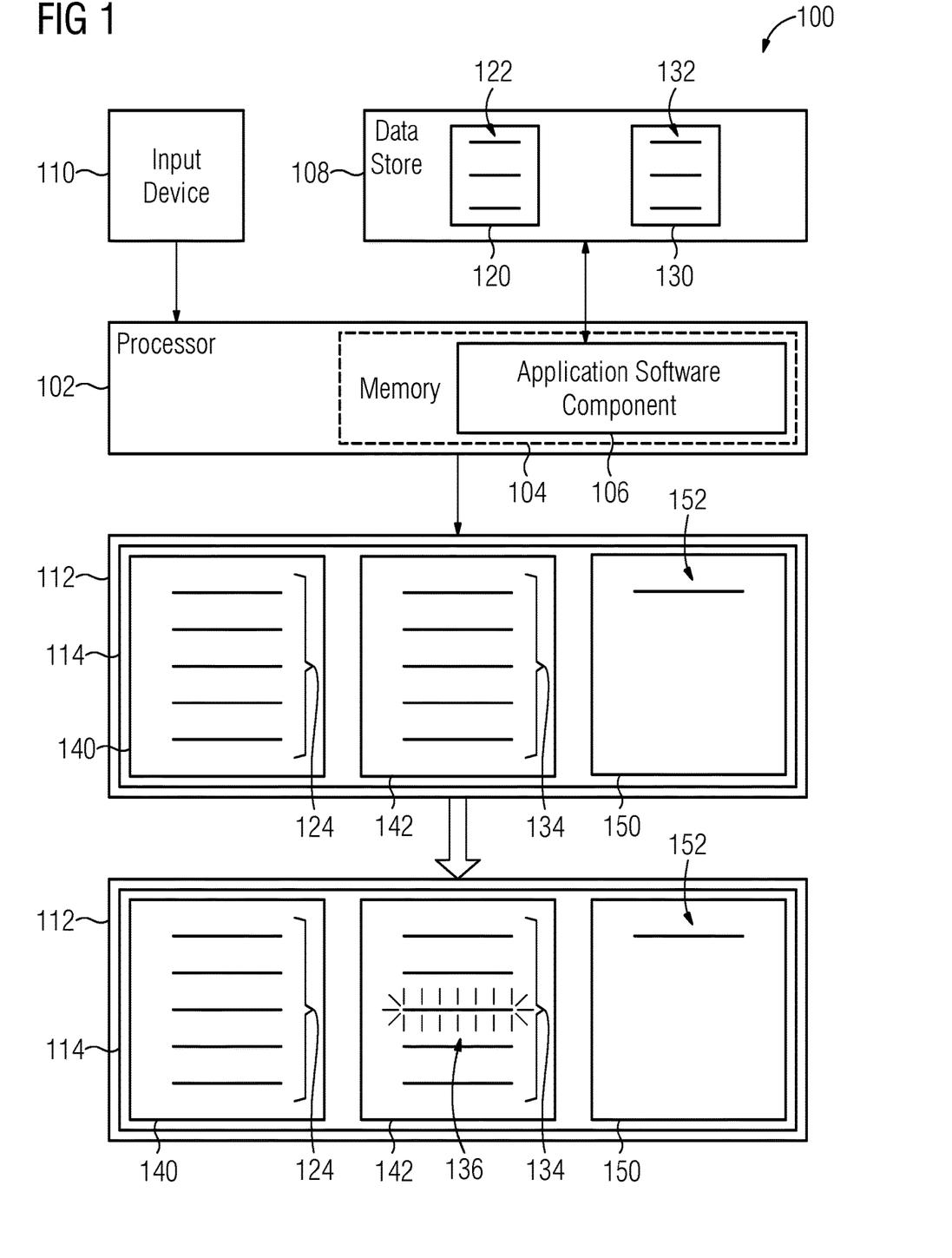
FIG. 1 illustrates a functional block diagram of an example system that facilitates merging artifact information in a product system.

With reference to FIG. 1, an example data processing system 100 is illustrated that facilitates introducing artifact information 122 of at least one first artifact document 120 into at least one second artifact document 130, wherein the second artifact document 130 may or may not yet include artifact information 132. The processing system 100 may include at least one processor 102 that is configured to execute at least one application software component 106 from a memory 104 accessed by the processor 102. The application software component 106 may be configured (e.g., programmed) to cause the processor 102 to carry out various acts and functions described herein. For example, the described application software component 106 may include and/or correspond to one or more components of PLM or ALM software application that is configured to generate and store product data in a data store 108 such as a database.

Examples of PLM systems that may be configured to include the introducing artifact information features described herein may include the Active Workspace features of Teamcenter, the NX suite of applications, Solid Edge, and/or LMS Imagine. LAB applications, all of which applications are produced by Siemens Product Lifecycle Management Software Inc., of Plano Tex. Examples of ALM systems that may be configured to include the merging artifact information features described herein may include Polarion ALM, an application produced by Polarion AG, of Gossau, Switzerland. However, it should be appreciated that the systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

It should be appreciated that it can be difficult and time-consuming to introduce artifact information from at least one first artifact document to at least one second artifact document (e.g., data records representing/storing data corresponding to parts, tools, documents, process descriptions, templates, materials, requirements specifications, respectively) in complex, production PLM or ALM environments. For example, having two or more documents in Polarion ALM, one containing general requirements from an original equipment manufacturer (OEM) and other documents containing specific requirements for particular supplier. The problem is how to effectively and efficiently share and transform requirements from OEM side to the supplier(s) side. By way of example, a detail of a work item of the first artifact document may have to be opened, a sort of duplicate action may have to be selected, an appropriate work item type may have to be chosen, a second artifact document may have to be chosen as a target document and after the work item is created, one may have to go to the target document and may have to move the work item to the appropriate place because according to other approaches it is created at the end of the document by default, wherein these steps may have to be performed manually, which is a long and not efficient process.

To enable the enhanced introduction of artifact information of at least one first artifact document 120 into at least one second artifact document 130, the described processing system 100 may include at least one input device 110 and at least one display device 112 (such as a display screen). The described processor 102 may be configured to generate a GUI 114 through the display device 112. Such a GUI may include GUI elements such as buttons, links, search boxes, lists, text boxes, images, scroll bars) usable by a user to provide inputs through the input device 110 that cause introducing artifact information of a first artifact document 120 into a second artifact document 130 from a data store 108. In particular, the GUI may include a first box 140 for displaying a first sequence 124 of artifact information 122 of the first artifact document 120, a second box 142 for displaying a second sequence 134 of artifact information 132 of the second artifact document 130, and a third box 150 corresponding to an introduction box for displaying at least one available introduction action 152.

In an example embodiment, the application software component 106 and/or the processor 102 may optionally be configured to receive at least one optional input through the input device 110 corresponding to an optional selection of the first artifact document 120 and of the second artifact document 130. By way of example, the application software component 106 and/or the processor 102 may be configured to cause the first sequence 124 of artifact information 122 of the first artifact document 120 and the second sequence 134 of artifact information of the second artifact document 130 to be displayed in the GUI 114. The display of the first sequence 124 and the second sequence 134 may be responsive and corresponding to this optional selection.

For the enhanced introducing of artifact information, the processor 102 may further be configured to receive at least one first input through the input device 110 corresponding to a first selection of at least one first subsequence 126 of the at least one first sequence 124 for introduction into the at least one second sequence 134.

The application software component 106 and/or the processor 102 may further be configured to determine at least one introduction action 152 available for introducing artifact information derived from the selected at least one first subsequence 126 into the at least one second sequence 134, wherein at least one of the selected at least one first subsequence 126, the at least one first sequence 124, the at least one first artifact document 120 or any combination thereof is of a first artifact information type, and wherein at least one of the at least one second sequence 134, the at least one second artifact document 130 or any combination thereof is of a second artifact information type being different from the first artifact information type. By way of example, the processor 102 may use an introduction algorithm to derive one of the at least one available introduction action 152, the artifact information to be derived from the selected at least one first subsequence, or any combination thereof. The artifact information derived from the selected at least one first subsequence 136 may, by way of example, include at least one of introducing some basic or some advanced content related to the selected at least one first subsequence 136, introducing some duplicate of or reference to the at least one first subsequence 136, or any combination thereof.

The application software component 106 and/or the processor 102 may further be configured to display the at least one available introduction action 152 in the introduction box in the GUI 114.

In addition, the application software component 106 and/or the processor 102 may be configured to receive at least one second input through the input device 110 corresponding to a second selection of one of the at least one available introduction action 152.

Responsive and corresponding to the second selection, the application software component 106 and/or the processor 102 may be configured to create at least one first amended subsequence 136 of artifact information in the second sequence 134 by introducing said artifact information being derived from the selected at least one first subsequence 126.

The described examples may provide an efficient way for users to introduce artifact information of at least one first artifact document into at least one second artifact document. This may be achieved by providing a smart way of introducing artifact information, whereby different artifact information types between source and target of the introduction action are taken into account and only adequate, available introduction actions are provided for selection and implementation.

In order to easily carry out the introduction of artifact information, an introduction algorithm may be used which recognizes the difference artifact information types and derives the available introduction actions. Furthermore, the introduction algorithm may also be used to derive the artifact information from the selected at least one first subsequence which is to be introduced into the second sequence, whereby the introduction algorithm assures that the artifact information to be introduced fits into the second sequence. This may imply that the introduction algorithm checks that the artifact information to be introduced possesses the adequate properties, layout, structure, etc. in order to ensure a successful and meaningful introduction into the second sequence. Such an algorithm may for example recognize identical subsequences within the first sequence 124 and the second sequence 134. In an example, such an algorithm recognizes similar subsequences within the first sequence 124 and the second sequence 134, e.g. using semantics and/or heuristics. Such similar subsequences may include a first subsequence and a second subsequence, wherein the second subsequence may include amended artifact information compared to the artifact information of the first subsequence. The amended artifact information may be such that pieces of artifact information may be missing, added or amended with respect to the first sequence. By way of example, the introduction algorithm which takes into account the artifact information type of the first artifact document 120 and the artifact information type of the second artifact document 130 in order to derive the at least one available introduction action 152. To this end, by way of example, a table may be used which relates all different kinds of introduction actions with all possible kinds of artifact information types included in the first artifact document 120 and the second artifact document 130, respectively. This table may e.g. be stored in the data store 108 and by way of example be updated automatically.

In example embodiments, the at least one processor may be configured to display the at least one first amended subsequence 136 in the GUI 114. This provides a user with more transparency and allows the user to check and validate the derived at least one first amended subsequence 136.

In example embodiments, the at least one processor may be configured to receive at least one third input through the input device 110 corresponding to a confirmation of the introduction of the created at least one first amended subsequence 136 into the in the second sequence 134. This end, an additional box may be provided for and displayed in the GUI, whereby the additional box allows a user to select either confirmation or dismissal of the introduction of the created at least one first amended subsequence 136. Consequently, a user may still have control of the introduction action and its implementation.

In further examples, the processor 102 may be configured to receive at least one fourth input through the input device 110 in the form of at least one of marking the at least one first subsequence 126, selecting a predefined menu entry, pressing real or on-screen keyboard buttons, for example CTRL+C, or any combination thereof. This means that a user may select the at least one first subsequence 126 which shall be introduced into the at least one second sequence 134. The selection of the at least one first subsequence 126 may be implemented in various ways including marking the at least one first subsequence 126, e.g. using a cursor, and then activating CTRL+C, e.g. on a keyboard.

In further examples, the processor 102 may be configured to receive at least one fifth input through the input device 110 corresponding to a third selection of a position within the at least one second sequence 134 for introduction of the artifact information derived from at least one first subsequence 124. Consequently, a user may still have control of the position where the derived artifact information is to be introduced in the second sequence 134.

It should also be appreciated that by way of example, that the processor 102 may be configured to receive the at least one fifth input in the form of at least one of marking the position within the at least one second sequence 134, selecting a predefined menu entry, pressing real or on-screen keyboard buttons, for example CTRL+V, or any combination thereof. The selection of the position may be implemented in various ways including marking the position within the at least one first sequence 134, e.g. using a cursor, and then activating CTRL+V, e.g. on a keyboard.

In further examples, the processor 102 may be configured to determinate a position within the at least one second sequence for introduction of the artifact information derived from at least one first subsequence 124 taking into account at least one of the artifact information types of the first artifact document 120 and of the second artifact document 130, the artifact document types of the first artifact document 120 and of the second artifact document 130, headings or parents of the at least one first subsequence 126 and the at least one second sequence 134, a user-selected configuration for introduction actions, or any combination thereof. Said position may, by way of example, be determined by the introduction algorithm which may take into account the mentioned pieces of information to determine the adequate position within the at least one second sequence 134. Such an algorithm is particularly helpful when several or many introduction actions need to be carried out and, e.g., when user interaction is not required or desired. This allows for automatically carrying out several or many introduction actions, optionally involving several or many artifact documents, which makes the suggested introduction of artifact information an efficient and time-saving process.

By way of example, some types of artifact documents may include headings or may be master documents to a branch document or vice versa, wherein in an example, the introduction algorithm identifies identical or related headings in the artifact information 122 of the first artifact document 120 and in the artifact information 132 of the second artifact document 130. Instead of or additionally to the headings, other artifact information, e.g. the same parents or the same branches, may be used to identify subsequences of artifact documents which are identical or at least related to each other. This allows for introducing artifact information derived from the first subsequence 126 such that a created first amended subsequence 136 may be introduced at an identical, related or adequate place within the second sequence 134.

In further examples, the processor 102 may be configured to determinate the at least one available introduction action 152 taking into account at least one of the artifact information types of the first artifact document 120 and of the second artifact document 130, the artifact document types of the first artifact document 120 and of the second artifact document 130, a user-selected configuration for introduction actions, or any combination thereof. Said at least one available introduction action 152 may, by way of example, be determined by the introduction algorithm which may take into account the mentioned pieces of information to determine the adequate, available introduction action or actions. Such an algorithm is particularly helpful when several or many introduction actions need to be carried out and, e.g., when user interaction is not required or desired. This allows for automatically carrying out several or many introduction actions, optionally involving several or many artifact documents, which makes the suggested introduction of artifact information an efficient and time-saving process.

It should also be appreciated that by way of example, that the processor 102 may be configured to derive the user-selected configuration from the user's at least one previous comparable selection. This implies that the method may be refined automatically by taking into account the user's at least one previous comparable selection. By way of example, the above-mentioned table relating all different kinds of introduction actions with all possible kinds of artifact information types included in the first artifact document 120 and the second artifact document 130, respectively, may be created in this way.

It should also be appreciated that in other examples, the processor 102 may be configured to generate a graphical user interface (GUI) 114 through the display device 112 that enables an options box 160 to be displayable in the GUI 114; cause the options box 160 to be displayed in the GUI 114; determine at least one introduction option 162 available for the selected available introduction action; receive at least one sixth input through the input device 110 corresponding to a fourth selection of one of the at least one available introduction action option 162; and create the at least one first amended subsequence 136 of artifact information in the second sequence 134 taking into account the selected at least one available introduction action option. The at least one introduction option offers additional features for the introduction of artifact information and makes the introduction of artifact information and a comfortable and specific process. By way of example, the at least one available introduction option 162 may include at least one of introducing some basic or some advanced content related to the selected at least one first subsequence 126, introducing some duplicate of or reference to the selected at least one first subsequence 126, or any combination thereof.

The determination of the at least one available introduction option may, by way of example, take into account at least one of the artifact information types of the first artifact document and of the second artifact document, the artifact document types of the first artifact document and of the second artifact document, a user-selected configuration for introduction actions, or any combination thereof.

In further examples, the at least one introduction action available to a user depends on at least one of a user status, a user security, an authentication status, an artifact document status, or any combination thereof. This may allow for a security concept which is configured to different user groups, such as administrators which have full permission, regular uses which have restricted permission and guests which have minimum permission to amend, and in particular to delete, artifact information of the considered artifact document. The available introduction actions may only be available if the respective user has correctly authenticated which improves security of the handled artifact document. The available introduction actions may only include pre-defined introduction actions which depend on the artifact document status, so that e.g. references are only allowed from a branch document to a master document and not vice versa.

In further examples, the system 100 may further include a computer system including a memory 104, an application software component 106, the at least one processor 102, the display device 112, and the input device 110, wherein the application software component 106 is included of instructions that when included in the memory 104 and executed by the at least one processor 102, cause the at least one processor 102 to generate the GUI 114 through the display device 112 responsive to inputs through the input device 112.

For all of the examples, the artifact document or the artifact information may include at least one of software documentation, applications, a complex data object, work items, references to work items, requirements, tasks, change requests, description, defects, test cases, or any combination thereof. The artifact information may e.g. be used in the context of agile software development.

The described examples may provide an efficient way for users to introduce virtually any type of object data (e.g., parts, tools, documents, process descriptions, templates, materials, requirements or any other type of product data) stored in a data store by enabling the described enhanced introduction of artifact information. Thus, the described examples may reduce the total cost of ownership of the application software component, by alleviating or at least minimizing the need for users or administrators to manually set up and manage introduction actions to introduce artifact information from a first artifact document into a second artifact document. Such efficient PLM or ALM introduction actions can be leveraged in any industry (e.g., Aerospace & Defense, Automotive & Transportation, Consumer Products & Retail, Electronics & Semiconductor, Energy & Utilities, Industrial Machinery & Heavy Equipment, Marine, or Medical Devices & Pharmaceuticals). Such introduction actions may also be applicable to consumer facing artifact information to be introduced from a first artifact document into a second artifact document.

Figure 2:
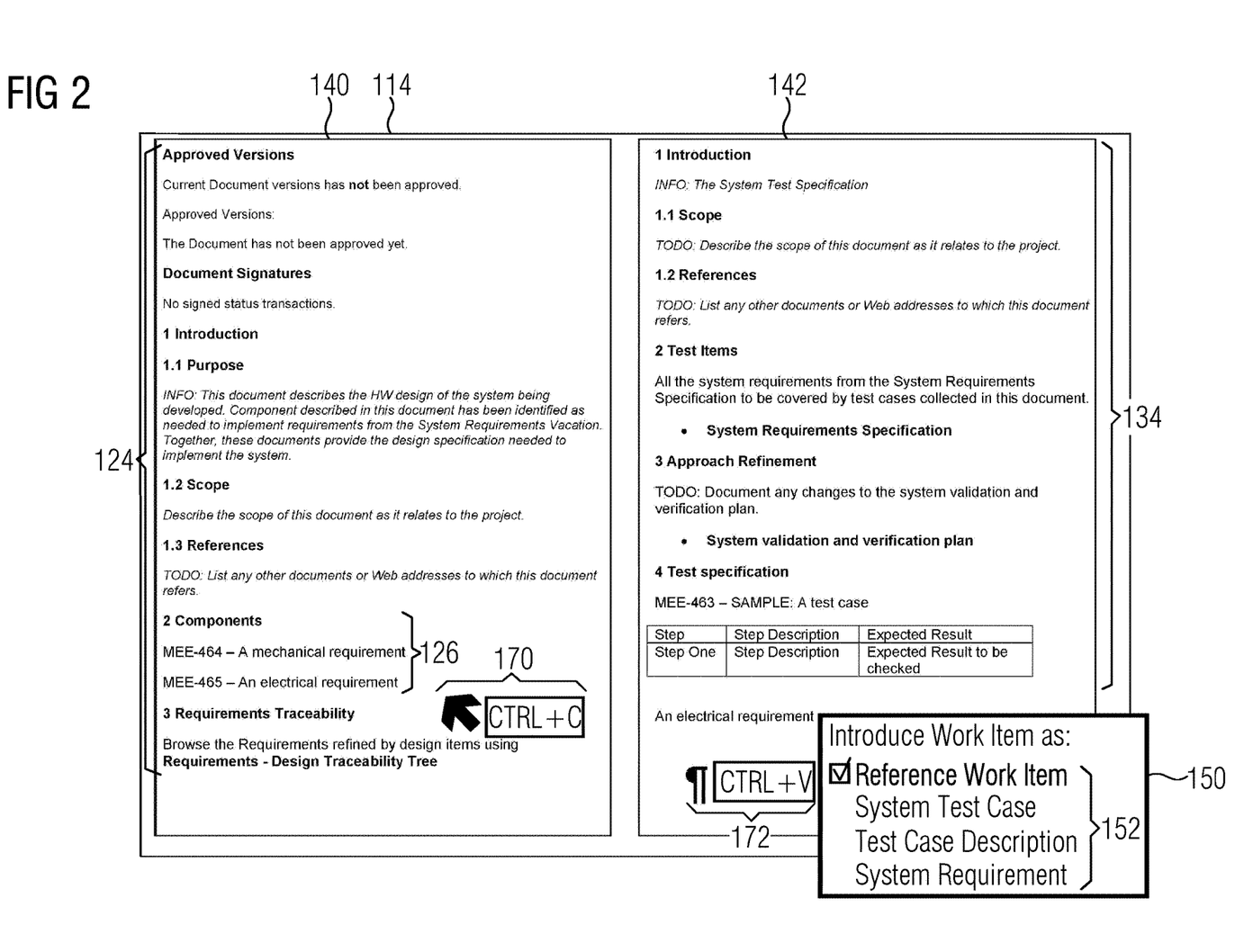
FIG. 2 illustrates a first exemplary graphical user interface including results that may be displayed to a user using the product system shown in FIG. 1.
Figure 3:
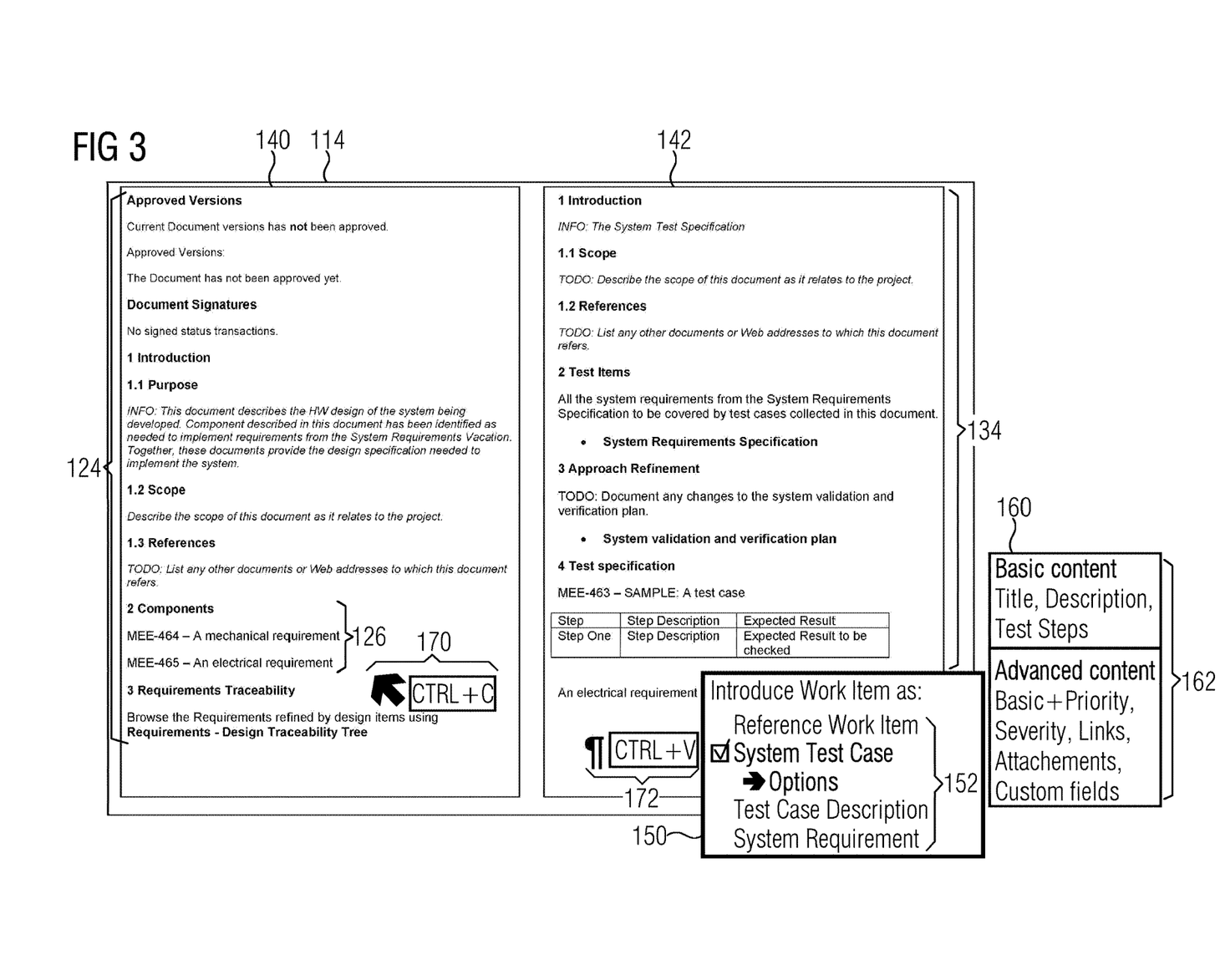
FIG. 3 illustrates a second exemplary graphical user interface including results that may be displayed to a user using the product system shown in FIG. 1.

Referring now to FIGS. 2 and 3, a first and a second exemplary graphical user interface including results that may be displayed to a user using the product system shown in FIG. 1 is illustrated, respectively. The GUI 114 includes a first box 140 for displaying a first sequence 124 of artifact information of a first artifact document. Furthermore, the GUI 114 includes a second box 142 for displaying a second sequence 134 of artifact information of the second artifact document. As can readily be seen, the first sequence 124 differs from the second sequence 134. E.g. the first sequence 124 is related to the description of a hardware design and the requirements specification of the hardware of a system. In contrast, the second sequence 134 is related to a system test specification and accordingly test cases for the system. Consequently, the first sequence 124 and the first artifact document on one hand and the second sequence 134 and the second artifact document on the other hand are of different types of artifact information.

To select at least one first subsequence 126 of the at least one first sequence 124 for introduction into the at least one second sequence 134, a first input may be given. As illustrated in FIGS. 2 and 3 with the reference sign 170, this first selection may be done using a cursor and by pressing real or on-screen keyboard buttons, for example CTRL+C. At least one available introduction action 152 is derived from the selected at least one first subsequence 126, whereby the at least one available introduction action 152 is displayed in a third box 150. One of the at least one available introduction action 152 may be selected using a second input. At least one first amended subsequence of artifact information is created in the second sequence 124 by introducing that artifact information being derived from the selected at least one first subsequence 126. To select a position within the at least one second subsequence 132 for introduction of that artifact information derived from the at least one first subsequence 124, a further input may be given. As illustrated in FIGS. 2 and 3 with the reference sign 172, this further input may be done using a cursor and by pressing real on-screen keyboard buttons, for example CTRL+V.

In FIG. 2, the introduction action "Reference Work Item" is selected out of four available introduction actions 152. In FIG. 3, the introduction action "System Test Case" is selected out of four available introduction actions 152. In addition, in FIG. 3, an options box 160 is displayed including available introduction action options 162 which have been determined. One of the at least one available introduction action options 162 may be selected using yet another input. The at least one first amended subsequence of artifact information is created in the second sequence 134 taking into account the selected at least one available introduction action option.

Figure 4:
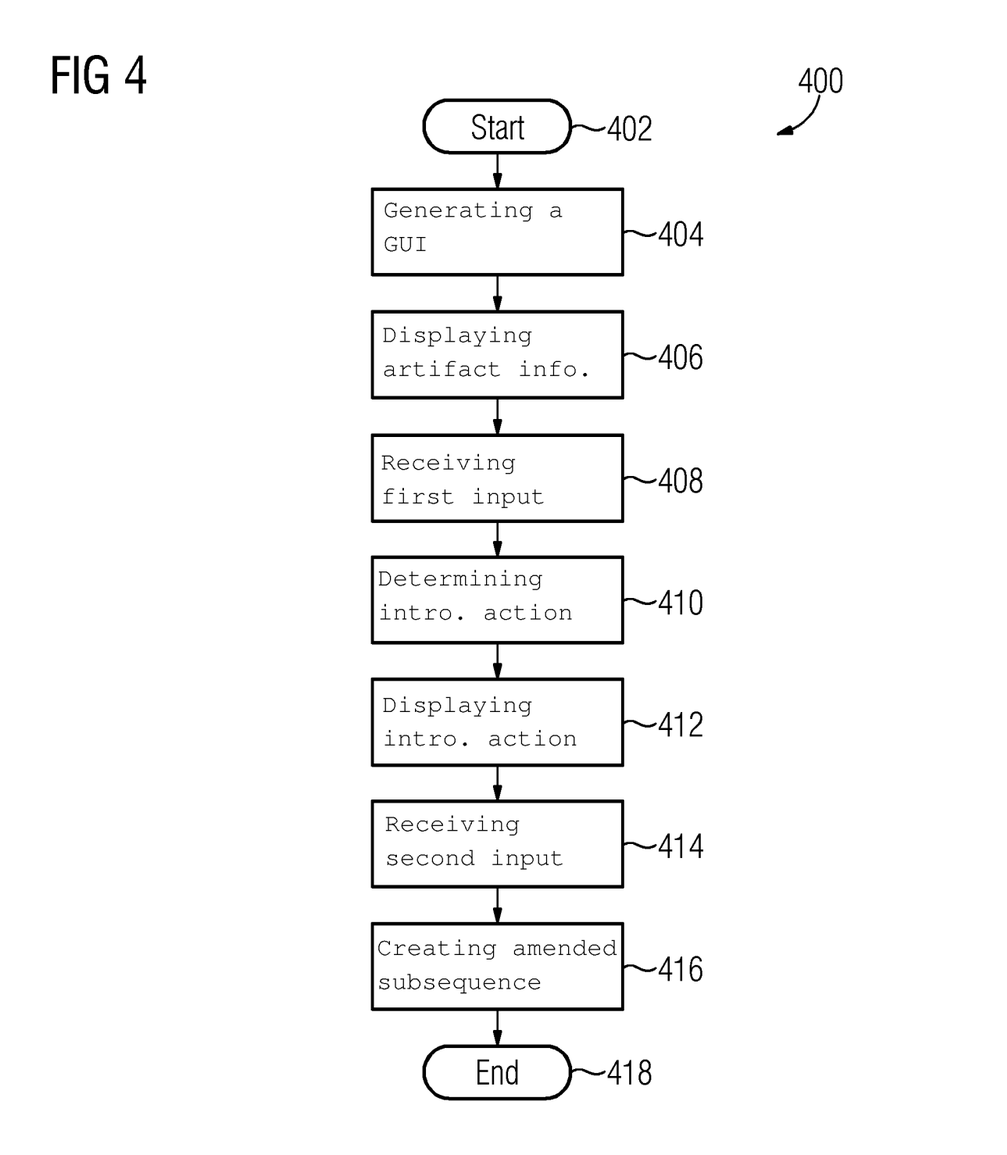
FIG. 4 illustrates a flow diagram of an example methodology that facilitates introducing artifact information in a product system.

Referring now to FIG. 4, a methodology 400 that facilitates introducing artifact information of at least one first artifact document into at least one second artifact document is illustrated. The method may start at 402 and the methodology may include several acts carried out through operation of at least one processor.

These acts may include an act 404 of generating a graphical user interface (GUI) through a display device that enables a first sequence of artifact information of the first artifact document and a second sequence of artifact information of the second artifact document stored in a data store and an introduction box to be displayable in the GUI; an act 406 of causing the first sequence of artifact information of the at least one first artifact document and the second sequence of artifact information of the at least one second artifact document to be displayed in the GUI; an act 408 of receiving at least one first input through an input device corresponding to a first selection of at least one first subsequence of the at least one first sequence for introduction into the at least one second sequence; an act 410 of determining at least one introduction action available for introducing artifact information derived from the selected at least one first subsequence into the at least one second sequence, wherein at least one of the selected at least one first subsequence, the at least one first sequence, the at least one first artifact document or any combination thereof is of a first artifact information type, and wherein at least one of the at least one second sequence, the at least one second artifact document or any combination thereof is of a second artifact information type being different from the first artifact information type; an act 412 of causing the at least one available introduction action to be displayed in the introduction box in the GUI; an act 414 of receiving at least one second input through the input device corresponding to a second selection of one of the at least one available introduction action; and an act 416 of creating at least one first amended subsequence of artifact information in the second sequence by introducing said artifact information being derived from the selected at least one first subsequence. At 418 the methodology may end.

It should be appreciated that the methodology 400 may include other acts and features discussed previously with respect to the processing system 100. For example, the methodology may include the act of receiving at least one third input through the input device corresponding to a confirmation of the introduction of the created at least one first amended subsequence into the in the second sequence.

In addition, the methodology may include the act of receiving at least one fourth input through the input device in the form of at least one of marking the at least one first subsequence, selecting a predefined menu entry, pressing real or on-screen keyboard buttons, for example CTRL+C, or any combination thereof. Further, the methodology may include in this context the act of receiving at least one fifth input through the input device corresponding to a third selection of a position within the at least one second sequence for introduction of the artifact information derived from at least one first subsequence.

In addition, in a further example, the methodology may include the act of receiving the at least one fifth input in the form of at least one of marking the position within the at least one second sequence, selecting a predefined menu entry, pressing real or on-screen keyboard buttons, for example CTRL+V, or any combination thereof.

Example embodiments of the methodology may also include the act of determining a position within the at least one second sequence for introduction of the artifact information derived from at least one first subsequence taking into account at least one of the artifact information types of the first artifact document and of the second artifact document, the artifact document types of the first artifact document and of the second artifact document, headings or parents of the at least one first subsequence and the at least one second sequence, a user-selected configuration for introduction actions, or any combination thereof.

In addition, in a further example, the methodology may include the act of determining the at least one available introduction action taking into account at least one of the artifact information types of the first artifact document and of the second artifact document, the artifact document types of the first artifact document and of the second artifact document, a user-selected configuration for introduction actions, or any combination thereof.

Furthermore, the methodology may include the act of deriving the user-selected configuration from the user's at least one previous comparable selection.

In addition, in a further example, the methodology may include the act of generating a graphical user interface (GUI) through the display device that enables an options box to be displayable in the GUI; causing the options box to be displayed in the GUI; determining at least one introduction option available for the selected available introduction action, receiving at least one sixth input through the input device corresponding to a fourth selection of one of the at least one available introduction action option; and creating the at least one first amended subsequence of artifact information in the second sequence taking into account the selected at least one available introduction action option.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, it should be appreciated that software components may be written in and/or produced by software environments/languages/frameworks such as Java, JavaScript, Python, C, C#, C++ or any other software tool capable of producing components and graphical user interfaces configured to carry out the acts and features described herein.

Figure 5:
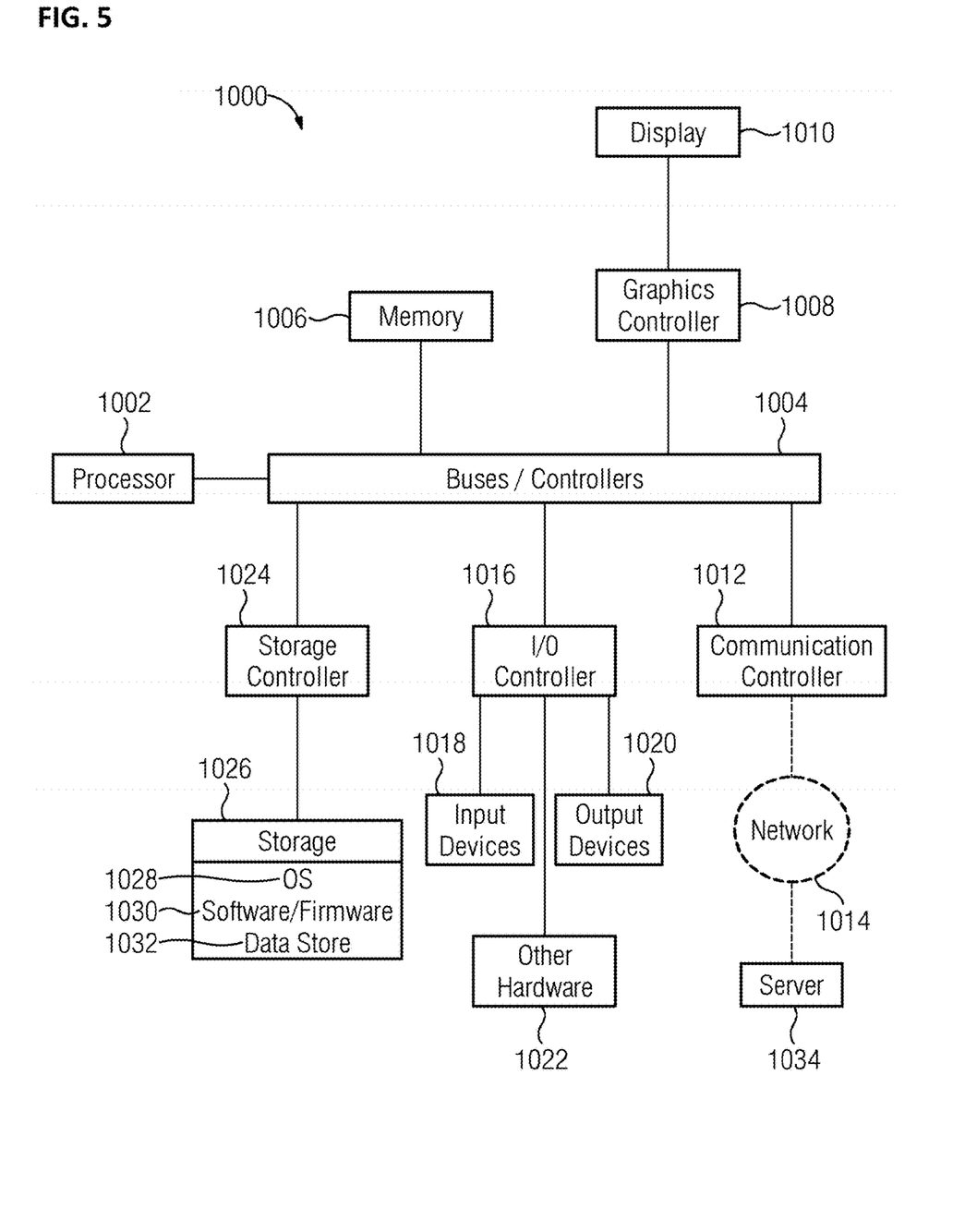
FIG. 5 illustrates a block diagram of a data processing system in which an embodiment can be implemented.

FIG. 5 illustrates a block diagram of a data processing system 1000 (also referred to as a computer system) in which an embodiment can be implemented, for example, as a portion of a product system, and/or other system operatively configured by software or otherwise to perform the processes as described herein. The data processing system depicted includes at least one processor 1002 (e.g., a CPU) that may be connected to one or more bridges/controllers/busses 1004 (e.g., a north bridge, a south bridge). One of the busses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). It should also be appreciated that various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1002 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which can be any suitable non-transitory machine usable or machine-readable storage medium. Examples, include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1012 may be connected to the network 1014 (not a part of data processing system 1000), which can be any public or private data processing system network or combination of networks, as known to those of skill in the art, including the Internet. Data processing system 1000 can communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, which may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "include" and "include," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A system for introducing artifact information of at least one first artifact document into at least one second artifact document, the system comprising:
    at least one processor configured to:
        generate a graphical user interface (GUI) through a display device that enables at least one first sequence of artifact information of the at least one first artifact document and at least one second sequence of artifact information of the at least one second artifact document stored in a data store and an introduction box to be displayable in the GUI;
        cause the at least one first sequence of artifact information of the at least one first artifact document and the at least one second sequence of artifact information of the at least one second artifact document to be displayed in the GUI;
        receive at least one first input through an input device corresponding to a first selection of at least one first subsequence of the at least one first sequence for introduction into the at least one second sequence;
        identify artifact information types and/or artifact document types of the selected at least one first subsequence of the first artifact document and the second sequence of the second artifact document, wherein at least one of the selected at least one first subsequence, the at least one first sequence, the at least one first artifact document, or any combination thereof is of a first artifact information type, and wherein at least one of the at least one second sequence, the at least one second artifact document, or any combination thereof is of a second artifact information type being different from the first artifact information type, wherein the artifact information types of the first artifact document and the second artifact document or the artifact document types of the first artifact document and the second artifact document comprise more than one of software documentation, applications, a complex data object, work items, references to work items, requirements, tasks, change requests, a description, defects, or test cases;
        recognize identical or related subsequences within the first sequence and the second sequence using semantics and/or heuristics;
        determine at least one introduction action available for introducing artifact information derived from the selected at least one first subsequence into the at least one second sequence at a place of the identical or related subsequence within the second sequence related to the selected at least one first subsequence, using the identified artifact information types and/or artifact document types of the selected at least one first subsequence of the first artifact document and the at least one second sequence of the second artifact document, such that the artifact information from the selected at least one first subsequence possesses properties, layout, and/or structure to fit into the at least one second sequence;
        cause the at least one available introduction action to be displayed in the introduction box in the GUI;
        receive at least one second input through the input device corresponding to a second selection of one of the at least one available introduction action; and
        create at least one first amended subsequence of artifact information in the second sequence by introducing the artifact information being derived from the selected at least one first subsequence.

2. The system according to claim 1, wherein the at least one processor is further configured to cause the at least one first amended subsequence to be displayed in the GUI.

3. The system according to claim 1, wherein the at least one processor is further configured to receive at least one third input through the input device corresponding to a confirmation of the introduction of the created at least one first amended subsequence into the in the second sequence.

4. The system according to claim 1, wherein the at least one processor is further configured to receive at least one fourth input through the input device in a form of at least one of marking the at least one first subsequence, selecting a predefined menu entry, pressing real or on-screen keyboard buttons, or any combination thereof.

5. The system according to claim 1, wherein the at least one processor is further configured to receive at least one fifth input through the input device corresponding to a third selection of a position within the at least one second sequence for introduction of the artifact information derived from the at least one first subsequence.

6. The system according to claim 5, wherein the at least one processor is further configured to receive the at least one fifth input in a form of at least one of marking the position within the at least one second sequence, selecting a predefined menu entry, pressing real or on-screen keyboard buttons, or any combination thereof.

7. The system according to claim 1, wherein the at least one processor is further configured to determine a position within the at least second sequence for introduction of the artifact information derived from the at least one first subsequence taking into account that at least one of the artifact information types of the first artifact document and of the second artifact document, the artifact document types of the first artifact document and of the second artifact document, headings or parents of the at least one first subsequence and the at least one second sequence, or any combination thereof.

8. The system according to claim 1, wherein the at least one processor is further configured to:
    generate a second graphical user interface (GUI) through the display device that enables an options box to be displayable in the second GUI;
    cause the options box to be displayed in the second GUI;
    determine at least one introduction option available for the selected available introduction action;
    receive at least one sixth input through the input device corresponding to a fourth selection of one of the at least one available introduction action option; and create the at least one first amended subsequence of artifact information in the second sequence taking into account the selected at least one available introduction action option.

9. The system according to claim 1, wherein the at least one introduction action available to a user depends on at least one of a user status, a user security, an authentication status, an artifact document status, or any combination thereof.

10. The system according to claim 1, further comprising:
a computer system including a memory, an application software component, the at least one processor, the display device, and the input device,
wherein the application software component is included of instructions that when included in the memory and executed by the at least one processor, cause the at least one processor to generate the GUI through the display device responsive to inputs through the input device.

11. The system according to claim 1, wherein the first artifact document and the second artifact document each comprise data records having data corresponding to requirement specifications.

12. The system according to claim 1, wherein the first artifact document and the second artifact document each comprise data records having data corresponding to parts, tools, documents, process descriptions, templates, materials, or combinations thereof.

13. The system according to claim 1, wherein the artifact information derived from the selected at least one first subsequence comprises content related to the selected at least one first subsequence, a duplicate of the at least first subsequence, a reference to the at least first subsequence, or a combination thereof.

14. A method for introducing artifact information of at least one first artifact document into at least one second artifact document, the method comprising, through operation of at least one processor:
generating a graphical user interface (GUI) through a display device that enables a first sequence of artifact information of the first artifact document and a second sequence of artifact information of the second artifact document stored in a data store and an introduction box to be displayable in the GUI;
causing the first sequence of artifact information of the at least one first artifact document and the second sequence of artifact information of the at least one second artifact document to be displayed in the GUI;
receiving at least one first input through an input device corresponding to a first selection of at least one first subsequence of the first sequence for introduction into the second sequence;
identifying artifact information types and/or artifact document types of the selected at least one first subsequence of the first artifact document and the second sequence of the second artifact document, wherein at least one of the selected at least one first subsequence, the first sequence, the at least one first artifact document, or any combination thereof is of a first artifact information type, and wherein at least one of the second sequence, the at least one second artifact document, or any combination thereof is of a second artifact information type being different from the first artifact information type, wherein the artifact information types of the first artifact document and the second artifact document or the artifact document types of the first artifact document and the second artifact document comprise more than one of software documentation, applications, a complex data object, work items, references to work items, requirements, tasks, change requests, a description, defects, or test cases;
recognizing identical or related subsequences within the first sequence and the second sequence using semantics and/or heuristics;
determining at least one introduction action available for introducing artifact information derived from the selected at least one first subsequence into the second sequence at a place of the identical or related subsequence within the second sequence related to the selected at least one first subsequence, using the identified artifact information types and/or artifact document types of the selected at least one first subsequence of the first artifact document and the second sequence of the second artifact document, such that the artifact information from the selected at least one first subsequence possesses properties, layout, and/or structure to fit into the second sequence;
causing the at least one available introduction action to be displayed in the introduction box in the GUI;
receiving at least one second input through the input device corresponding to a second selection of one of the at least one available introduction action; and
creating at least one first amended subsequence of artifact information in the second sequence by introducing the artifact information being derived from the selected at least one first subsequence.

15. The method according to claim 14, further comprising through operation of the at least one processor:
causing the at least one first amended subsequence to be displayed in the GUI.

16. The method according to claim 14, further comprising through operation of the at least one processor:
receiving at least one third input through the input device corresponding to a confirmation of the introduction of the created at least one first amended subsequence into the second sequence.

17. The method according to claim 14, further comprising through operation of the at least one processor:
receiving at least one fourth input through the input device in a form of at least one of marking the at least one first subsequence, selecting a predefined menu entry, pressing real or on-screen keyboard buttons, or any combination thereof.

18. The method according to claim 14, further comprising through operation of the at least one processor:
receiving at least one fifth input through the input device corresponding to a third selection of a position within the second sequence for introduction of the artifact information derived from the at least one first subsequence.

19. The method according to claim 18, further comprising through operation of the at least one processor:
receiving the at least one fifth input in a form of at least one of marking the position within the second sequence, selecting a predefined menu entry, pressing real or on-screen keyboard buttons, or any combination thereof.

20. The method according to claim 14, further comprising through operation of the at least one processor:
determining a position within the second sequence for introduction of the artifact information derived from the at least one first subsequence taking into account at least one of the artifact information types of the first artifact document and of the second artifact document, the artifact document types of the first artifact document and of the second artifact document, headings or parents of the at least one first subsequence and the second sequence, or any combination thereof.

21. The method according to claim 14, further comprising through operation of the at least one processor:
generating a second graphical user interface (GUI) through the display device that enables an options box to be displayable in the second GUI;
causing the options box to be displayed in the second GUI;
determining at least one introduction option available for the selected available introduction action;
receiving at least one sixth input through the input device corresponding to a fourth selection of one of the at least one available introduction action option; and
creating the at least one first amended subsequence of artifact information in the second sequence taking into account the selected at least one available introduction action option.

22. The method according to claim 14, wherein the at least one introduction action available to a user depends on at least one of a user status, a user security, an authentication status, an artifact document status, or any combination thereof.

23. A non-transitory computer readable medium encoded with executable instructions that when executed, cause at least one processor to at least perform:
generate a graphical user interface (GUI) through a display device that enables a first sequence of artifact information of a first artifact document and a second sequence of artifact information of a second artifact document stored in a data store and an introduction box to be displayable in the GUI;
cause the first sequence of artifact information of the first artifact document and the second sequence of artifact information of the second artifact document to be displayed in the GUI;
receive at least one first input through an input device corresponding to a first selection of at least one first subsequence of the first sequence for introduction into the second sequence;
identify artifact information types and/or artifact document types of the selected at least one first subsequence of the first artifact document and the second sequence of the second artifact document, wherein at least one of the selected at least one first subsequence, the first sequence, the first artifact document, or any combination thereof is of a first artifact information type, and wherein at least one of the second sequence, the second artifact document, or any combination thereof is of a second artifact information type being different from the first artifact information type, wherein the artifact information types of the first artifact document and the second artifact document or the artifact document types of the first artifact document and the second artifact document comprise more than one of software documentation, applications, a complex data object, work items, references to work items, requirements, tasks, change requests, a description, defects, or test cases;

recognize identical or related subsequences within the first sequence and the second sequence using semantics and/or heuristics;

determine at least one introduction action available for introducing artifact information derived from the selected at least one first subsequence into the second sequence at a place of the identical or related subsequence within the second sequence related to the selected at least one first subsequence, using the identified artifact information types and/or artifact document types of the selected at least one first subsequence of the first artifact document and the second sequence of the second artifact document, such that the artifact information from the selected at least one first subsequence possesses properties, layout, and/or structure to fit into the second sequence;

cause the at least one available introduction action to be displayed in the introduction box in the GUI;

receive at least one second input through the input device corresponding to a second selection of one of the at least one available introduction action; and create at least one first amended subsequence of artifact information in the second sequence by introducing the artifact information being derived from the selected at least one first subsequence.

* * * * *